United States Patent Office 2,716,647
Patented Aug. 30, 1955

2,716,647
N-CARBOXY ANHYDRIDE OF α-AMINO ACIDS

George A. Richardson, Dayton, Ohio, assignor to Monsanto Chemical Company, St. Louis, Mo., a corporation of Delaware No Drawing. Application July 30, 1952,
Serial No. 301,791

14 Claims. (Cl. 260—307)

This invention relates to the methods of preparing the N-carboxy anhydride of α-amino acids free from a heterocyclic group. More specifically the instant invention relates to a novel process for the preparation of N-carboxy anhydrides of α-amino acids free from a heterocyclic group comprising the dispersion of the α-amino acid in an anhydrous, organic-liquid medium, subjecting same to gaseous sulfur dioxide and treating the addition product produced thereby with phosgene.

In the copending patent application Serial No. 170,051, filed June 23, 1950, by George A. Richardson, now U. S. Patent No. 2,647,907, issued August 4, 1953, there is described and claimed a method of preparing N-carboxyglycine anhydride involving the use of the hydrochloride salt of the amino acid and phosgene in a glacial acetic acid medium. In copending application Serial No. 170,052, filed June 23, 1950, by George A. Richardson, now U. S. Patent No. 2,653,946, issued September 29, 1953, there is described and claimed the method of preparing N-carboxyglycine anhydride involving the use of the hydrochloride salt and phosgene in a medium of methyl ethyl ketone. The methods of the copending applications are quite satisfactory in dry atmospheres or if the dry-box techinques are employed. Attempts to prepare the N-carboxy anhydrides in the humid conditions prevailing in Eastern United States of America during the warmer months of the year have resulted in very small yields or no yields at all.

The purpose of the present invention is to provide a new method for the preparation of N-carboxy anhydrides of the various α-amino acids, which method is not subject to variations in humidity, and which method can be practiced under the normal prevailing humidities experienced in spring and summer months. A further purpose of the invention is to provide an industrially practicable method for converting α-amino acids into valuable N-carboxy anhydrides. Other purposes of the present invention will be apparent from the following description of the invention.

The phrase "α-amino acids" embraces the natural and synthetic α-amino acids, wherein the R group is inert in the instant process. Accordingly, this language includes those α-amino acids which contain functional radicals in the R group, which radicals have been suitably blocked to render same inert.

It has been found that the process of converting amino acid salts into the corresponding N-carboxy anhydrides is critically affected by the nature of the amino acid salt used in the reaction. Although hydrochloride salts of the amino acids can be used in the preparation of some of the N-carboxy anhydrides, the yields in such cases are usually low. Furthermore, the N-carboxy anhydrides cannot be prepared from the hydrochloric acid salts of certain of the amino acids, for example, the N-carboxy anhydride of cysteine, homocysteine, or of other natural or synthetic amino acids, which contain reactive mercapto groups. In accordance with this invention it has been found that the sulfur dioxide addition product of α-amino acids provides a much more satisfactory composition for conversion to the N-carboxy anhydrides. Accordingly, even under conditions of high humidity, satisfactory yields can be obtained.

This invention is directed to the preparation of N-carboxy anhydrides having the structural formula:

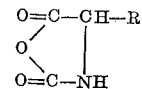

from natural and synthetic α-amino acids having the structural formula:

wherein R is a monovalent organic radical, including hydrogen, which is inert to the gaseous sulfur dioxide and phosgene under the hereinafter disclosed reaction conditions.

Thus, illustrative α-amino acids, which can be converted directly to the N-carboxy anhydride derivatives thereof, in accordance with the practice of this invention, are: glycine, alanine, valine, norvaline, leucine, norleucine, isoleucine, phenylalanine, methionine, etc., and homologues thereof. Suitable α-amino acids which first require the blocking of the functional groups in the R radical, to render same inert during the reaction of the α-amino acid with gaseous sulfur dioxide and phosgene, are, for example: lysine, ornithine, arginine, canavanine, cysteine, homocysteine, tyrosine, 3,5-diiodotyrosine, 3,5-dibromotyrosine, thyroxine, 3,4-dihydroxyphenylalanine, threonine, serine, β-hydroxyglutamic acid, glutamic acid, aspartic acid, etc. and homologues and derivatives thereof.

Accordingly, as is shown hereinafter, R can be hydrogen or a saturated hydrocarbon radical, for example an alkyl or aralkyl radical, or thiaalkyl radical and the unblocked moiety of the R groups are principally alkyl and aralkyl radicals which have one or more of the hydrogen atoms substituted by an iodo or bromo atom and/or a functional radical from the group comprising amino, imino, mercapto, hydroxy and carboxy radicals. The aforesaid functional radicals are in turn rendered inert to the processing conditions of this invention, as hereinafter described.

It is apparent that other radicals than those specifically disclosed above are applicable since the R radical is inert insofar as the nature of the present reaction is concerned. However, R preferably has a molecular weight of less than about 350 to avoid processing materials, the N-carboxy anhydrides of which generally would be difficult to purify by conventional means and would presumably have little commercial value. Accordingly, whereas the natural α-amino acids are preferred materials, the various synthetic α-amino acids, which conform to the disclosed structure and requirements, are operable materials for employment in the novel process of this invention.

It is of interest to note that those α-amino acids containing a heterocyclic group, as for example, histidine, tryptophane and proline, are not inert reactants in the instant process, since the heterocyclic ring is too unstable to withstand the herein disclosed processing conditions.

In addition to the alkyl and aralkyl radicals of the natural α-amino acids, R also can be other saturated hydrocarbon radicals, as for example, cycloalkyl, aryl and alkaryl radicals, which additional synthetic α-amino acids can be prepared by the chemist. Preferably the saturated hydrocarbon radical does not contain more than about 16 carbon atoms. It is apparent that the term "saturated hydrocarbon" radical, as employed in this specification and the claims, excludes benzene ring unsaturation, which is recognized to be of a different nature from other classes of unsaturated compounds. Thus, R is a hydrocarbon radical free from non-benzenoid unsaturation.

Where the R group contains a thia sulfur atom, the preferred class of radicals is shown by the formula:

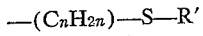

wherein $n$ is an integer from one (1) to four (4) and R' is a saturated hydrocarbon radical containing up to 12 carbon atoms. Accordingly, the R group is a thia-hydrocarbon radical free from non-benzenoid unsaturation containing up to 16 carbon atoms.

Where the R group contains an amino radical as a substituent for a hydrogen atom of the saturated hydrocarbon radical the preferred class of lysine-type α-amino acids would possess an R group having the structure shown by the formula:

$$—(C_nH_{2n})—NH_2$$

wherein $n$ is an integer from one (1) to ten (10).

Where the R group contains a hydroxyl radical as a substituent for a hydrogen atom of the saturated hydrocarbon radical, which preferably contains up to about 13 carbon atoms, a preferred class of compounds, which can also possess iodine and bromine as substituents for a hydrogen atom, are those wherein the R group would have the structure shown by the formula:

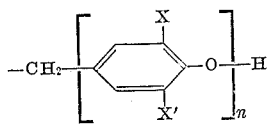

wherein X and X' are radicals of the group consisting of hydrogen, iodine, bromine and hydroxyl and $n$ is an integer from one (1) to two (2). Typical examples of this class are the following naturally occurring α-amino acids:

Tyrosine:

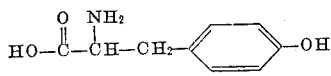

3,5-diiodotyrosine:

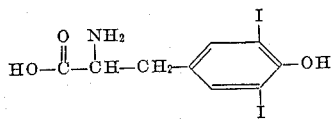

3,5-dibromotyrosine:

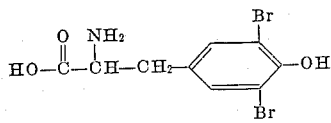

Thyroxine:

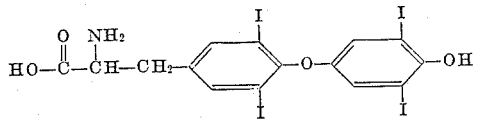

3,4-dihydroxyphenylalanine:

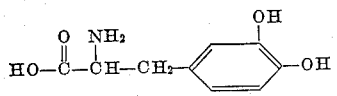

Di(α-amino acids) having the structural formula:

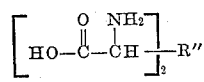

can also be employed to prepare the di(N-carboxy anhydrides) of said amino acids, which anhydrides have the structural formula:

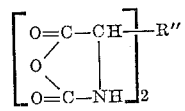

wherein R" is a divalent organic radical preferably containing not more than about 16 carbon atoms and the said radical is inert to gaseous sulfur dioxide and phosgene under the processing conditions of this invention. Any functional radicals within the R" group can be blocked in a similar manner to the functional radicals of the monovalent organic radicals. The natural di(α-amino acid), cystine, is an example of this class of compounds.

Where the α-amino acid has one or more functional groups within the R radical it is necessary to block or mask said group to render the material inert before conversion to the N-carboxy anhydride by the novel process of this invention. Any suitable blocking group can be used, and the procedure for blocking the functional radicals of the R group and the nature of the blocking agent as not regarded as a part of this invention, being a conventional technique well-known to the art.

For example, where the R group contains an amino radical it is necessary to convert said amino radical into an inactive form. In order to prevent the simultaneous inactivation of the α-amino group, a copper complex salt is formed by treating the amino acid with a soluble copper salt, such as copper carbonate. By this reaction the carboxyl group and the α-amino group are reacted to form a copper complex which is stable under the conditions necessary to block the non-alpha amino group. The latter reaction is effected by means of an acid chloride of an organic monocarboxylic acid or an alkyl or aralkyl chloroformate, such as acetyl chloride, methyl chloroformate, and benzyl chloroformate. The resulting N-carboalkoxy derivative is then treated with a reagent which breaks the copper complex by precipitating the copper in an insoluble form. Such a reaction restores the carboxyl radical and the α-amino radical without affecting the other blocked amino radical. The resulting stable derivative can be separated from the reaction mixture as a crystalline product and can be recrystallized from hot water solution.

It is possible to convert a hydroxyl radical to an inactive form in a similar manner by first temporarily stabilizing the carboxyl and α-amino radicals with a soluble copper salt and thereafter masking the hydroxyl radical by reacting with one of the aforesaid reagents to form ester linkages and proceeding as with the material having an amino radical in the R group.

Where the R group contains the mercapto radical it is necessary to convert the mercapto radicals into sulfide radicals, in which form the sulfur is not reactive under the conditions of conversion into N-carboxy anhydride radicals. Effective blocking agents are the saturated hydrocarbon halides, for example, butyl bromide, cyclohexyl chloride, benzyl chloride, bromobenzene, and p-tolyl chloride, or any other alkyl, cycloalkyl, aralkyl, aryl or alkaryl halides, and especially those having up to 12 carbon atoms. The procedure for blocking the mercapto groups preferably involves the reaction of the amino acid with the hydrocarbon halide in the liquid medium at temperatures substantially below room temperature.

By the proper selection of blocking agents the masking group can be removed after the α-amino acid is converted to the N-carboxy anhydride or polypeptides produced therefrom. Accordingly, the functional radical of the R group can be reactivated. Thus, for example, the carbobenzoxy group can be removed by means of catalytic hydrogenation, by reduction with metallic sodium in liquid ammonia, by the use of phosphonium iodide, etc, The practice of this invention involves the dissolution or suspension of the amino acid in a solvent, or other dispersing medium, and thereafter treating the amino acid with gaseous sulfur dioxide to convert it into an addition product of sulfur dioxide and the amino acid. The reaction mixture is then treated with phosgene to convert the said addition product into the N-carboxy amino acid anhydride. Since these anhydrides are decomposed by water, the reaction medium must be anhydrous. Glacial acetic acid, methyl ethyl ketone, acetone, benzene, toluene, dioxane, tetrahydrofuran and other organic liquids available in anhydrous form and stable under the conditions of reaction can be used. To facilitate the formation of high yields of the N-carboxy anhydride and simple recoveries of the product from the reaction medium it is desirable to select a medium which is a solvent for the N-carboxy anhydride but not for either the amino acid or the sulfur dioxide-addition product thereof. The practice enables the mechanical suspension of the amino acid in the medium, the suspension of the addition product in the medium, the purification of the solution by filtration and the recovery of the desired product by the addition of non-solvents for the N-carboxy anhydride to the solvent mixture. Suitable non-solvents for the N-carboxy anhydride include petroleum ether, hexane and chlorinated aliphatic hydrocarbons, such as tetrachloroethane.

The use of the solvents and non-solvents described in the preceding paragraph represents the optimum practice by which the best yields of most of the N-carboxy anhydrides can be recovered. A much wider variety of solvents can be used, but in general lower yields and often less pure products will be obtained because of the lack of a difference in solubility of the initial material and the product. If the amino acid or the sulfur dioxide-addition product of the amino acid are not insoluble in the selected medium the separation of impurities originally present in the amino acid cannot be easily effected. Furthermore if the N-carboxy anhydride cannot be precipitated by cooling or by the addition of an excess of one of the specified or known non-solvents, lower yields of products will inevitably result. However, other solvents can be used effectively and the product can be recovered without the addition of a non-solvent.

The treatment of the amino acid with sulfur dioxide is preferably conducted at approximately room temperatures, for example from about 10° C. to about 25° C., but optimum practice utilizes temperatures between about 15° C. and about 20° C. At low temperatures the reaction rate may become impracticably slow, and at higher temperatures the sulfur dioxide-amino acid addition product may decompose to form the original amino acid and sulfur dioxide. When the amino acid has been converted to the addition product, as evidenced by the presence of sulfur dioxide in the effluent gas stream, the reaction mixture is treated with phosgene at temperatures between about 15° C. and about 60° C. The lower temperatures in the specified range, being close to the temperature of liquid phosgene, may retard the reaction rate to an objectionable extent. Furthermore, temperatures in the higher part of the range may, under some circumstances, induce the decomposition of the N-carboxy anhydrides to form polypeptides. Accordingly, optimum practice utilizes temperatures of from about 25° C. to about 45° C. for the phosgenation reaction. The N-carboxy anhydrides so prepared can be recovered from the solution by conventional procedures, for example by precipitation or cooling, with or without concentration; by precipitation with non-solvents; or by combination of these procedures.

The N-carboxy amino acid anhydrides prepared in accordance with the preferred method are of unusual purity and can be used in the preparation of protein resins or artificial proteins, for food, medicinal or other uses.

The methods and processes of the following examples have been selected only by way of illustration, being typical and preferred embodiments of the invention. It is apparent that the invention is not limited to these precise methods and that changes can be made therein without departing substantially from the instant invention.

*Example 1*

A four-necked, 500-ml. flask provided with a water-cooled condenser, a gas-inlet tube, a mechanical-stirring device and a thermometer, was charged with 20 grams of glycine and 252 grams of methyl ethyl ketone. The flask and its contents were cooled to 20° C. by means of an ice bath. Sulfur dioxide gas was then passed into the reaction flask as rapidly as possible while vigorously stirring to maintain the temperature of approximately 20° C. The temperature rose to a maximum of 25° C. in the early stages, but gradually subsided to 20° C. during the reaction. As soon as sulfur dioxide was detected in the gas discharge from the condenser the reaction was discontinued. The ice bath was then removed and phosgene was passed into the reaction vessel at the rate of about two bubbles per second. The temperature was raised to 23–24° C. while continuing the phosgene addition. The reaction was continued for 14 hours until no sulfur dioxide was found to be present in the gas discharge. The white solid remaining in the flask was separated by filtration and washed with small proportions of methyl ethyl ketone. The combination filtrate and washings were then evaporated to one-third of its original volume and then three to four volumes of hexane were added. The precipitate, so obtained, was separated by filtration and washed five times with hexane. The combined precipitates were dried in a vacuum desiccator over concentrated sulfuric acid for ten hours. The resultant product was identified as N-carboxyglycine anhydride. A yield of 73 per cent based on the glycine was obtained.

*Example 2*

Using the procedure of the previous example, glycine was converted to N-carboxyglycine anhydride, except that temperatures of 28° C. to 30° were used for the phosgenation step. With the use of these temperatures the reaction was completed in five hours but only 54 per cent yield of the desired product was obtained.

*Example 3*

To demonstrate the superiority of the sulfur dioxide method over the previous hydrochloride salt method, the procedure was duplicated except that 11.31 grams of glycine hydrochloride was used. Very careful recovery of the product produced a maximum yield of 33.1 per cent of the N-carboxyglycine anhydride and a substantially larger proportion of various tars and resins. This reaction was run for a substantially longer period of time to assure completion of the reaction.

*Example 4*

Using the procedure described in Example 1, valine was treated with sulfur dioxide at 20° C. The product, so obtained, was then treated with phosgene at 27° C. for six hours. The N-carboxy anhydride of valine was recovered in a yield of 82 per cent by evaporation of the methyl ethyl ketone solution to near dryness and recrystallization from hexane.

*Example 5*

Using the procedure described in Example 1, L-leucine was treated with sulfur dioxide at 20° C. The product, so obtained, was then treated with phosgene at 27° C. for six hours. By evaporating the methyl ethyl ketone solution almost to dryness, adding 100 cc. of hexane and evaporating this almost to dryness, a near quantitative yield of a white crystalline product, identified as N-carboxyleucine anhydride, was recovered.

Example 6

By a procedure identical to that of Example 1, alanine was converted to N-carboxyalanine anhydride.

Example 7

Tyrosine was dissolved in a minimum quantity of boiling water. A solution of basic copper carbonate was added to the amino acid solution in a slight excess which was evidenced by the deposition of a green precipitate. The resulting solution of the copper complex of tyrosine was then transferred to a suitable reaction flask provided with a dropping funnel and a thermometer. The solution was cooled to approximately 5° C. and a slight excess of the stoichiometric proportion of benzyl chloroformate was introduced dropwise at a rate which permitted the maintenance of a temperature below 10° C. An equivalent proportion of sodium hydroxide solution was added simultaneously. All of the reagents were introduced within a period of 35 minutes. The reaction mixture was then stirred for fifteen minutes and a dark blue precipitate, which formed, was separated by filtering. The precipitate was suspended in warm water and saturated with hydrogen sulfide for one hour. The reaction mixture was then boiled to remove the excess of hydrogen sulfide and the precipitated copper sulfide was separated by filtering at near boiling temperatures. Upon cooling to 0° C. the white precipitate of the O-carbobenzoxy tyrosine was recovered and recrystallized from hot water solution.

Example 8

A five-gram sample of the compound prepared in the preceding experiment was charged to a 500-ml., four-necked flask containing 200 cc. of methyl ethyl ketone. The mixture was cooled to 18° C. and sulfur dioxide gas was added as rapidly as possible until sulfur dioxide gas was detected in the exit gas stream. After warming the reaction mixture to 30° C., phosgene was added at a slow uniform rate. The mixture cleared in about ten minutes, then became a slurry and about two hours later cleared again to form a light amber solution. The mixture was then evaporated to dryness in vacuo (pressure about 20-25 mm.) at 40° C. The resulting product was identified as O-carbobenzoxy tyrosine-N-carboxy anhydride which has the following structure:

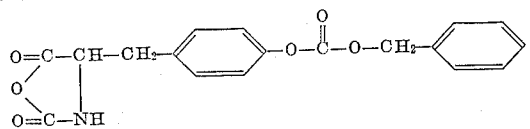

Example 9

L-lysine was dissolved in a minimum quantity of boiling water. Basic copper carbonate solution was then added until no more of the carbonate was dissolved as evidenced by the fact that green copper carbonate settled to the bottom unreacted. The solution was decanted from the excess copper carbonate, then transferred to a suitable reaction flask and cooled to 0° C. to 5° C. Benzyl chloroformate and a normal solution of sodium hydroxide were added dropwise over a period of 35 minutes. After an equivalent amount of reagent had been added, the reaction mixture was stirred for 15 minutes and the resulting precipitate separated by filtration. The product was suspended in warm water and saturated with hydrogen sulfide gas for 30 minutes. The solution was boiled for ten minutes. The precipitated copper sulfide was removed by filtering the hot solution. The white precipitate which formed upon cooling of the filtrate to 0° C. was separated and re-crystallized from hot water. The white crystalline product formed was identified as ε-N-carbobenzoxy-L-lysine.

Example 10

A 5.5-gram sample of the compound prepared in the preceding experiment was suspended in 200 cc. of anhydrous methyl ethyl ketone in a 500-ml., four-necked, glass flask fitted with a mechanical stirrer, a thermometer, a reflux condenser, and a gas-inlet tube. The reactor was placed in an ice bath and with vigorous stirring sulfur dioxide gas was introduced as rapidly as possible without permitting the temperature to exceed 20° C. until sulfur dioxide was detected in the exit gas from the condenser. Then the flow of sulfur dioxide was stopped and the flask and its contents warmed to 27° C. A stream of phosgene was then passed into the reaction mixture at a slow regular rate while the temperature rose slightly due to the heat of reaction. After five minutes, the reaction mixture cleared and a pale yellow solution was formed. In another five minutes the solution became a heavy slurry and upon continued addition of phosgene for two and one-half hours at 31° C., the reaction mixture again became clear. The methyl ethyl ketone was evaporated under reduced pressure (about 20-25 mm.) to about one-tenth of its original volume and 200 cc. of hexane was added. The mixture was filtered and the residue re-crystallized from 300 cc. of benzene. The resulting compound having a melting point of 98.5 to 99.5° C. was identified as ε-N-carbobenzoxy-L-lysine-α-N-carboxy anhydride having the structural formula:

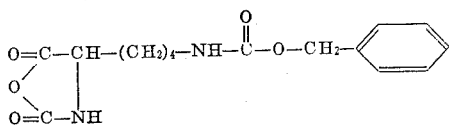

Example 11

A four-necked, 500-ml. flask fitted with gas-inlet tube, a power-driven rotary stirrer, a reflux condenser and thermometer, was charged with 350 ml. of methyl ethyl ketone and with 20 grams of methionine. The mixture was cooled to 20° C. and sulfur dioxide passed into the reaction medium at a steady rapid rate until the solution was saturated and free sulfur dioxide was detected in the condenser effluent gas. At this time the sulfur dioxide flow was interrupted and, after warming the solution to 30° C., phosgene was introduced at a rate which permitted the maintenance of the temperature for three hours at 30° C., at which time the solution cleared. The solvent was evaporated in vacuo (pressure about 20-25 mm.) at 40° C. to produce a compound which was acetone soluble and which violently decomposed by water at 75° C. or higher with the evolution of gas and deposition of a high-melting solid. The compound was identified as methionine N-carboxy anhydride with the structural formula:

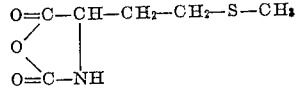

Example 12

A two-liter, three-necked flask was provided with a mechanical stirrer and immersed in a Dry Ice-acetone bath. The flask was charged with one liter of liquid ammonia and nine grams of sodium metal was added thereto. The flask was gradually charged with 20 grams of L-cystine over a period of five minutes with slow stirring to prevent a too rapid reaction. This reaction converted the cystine into two mole equivalents of cysteine. After stirring the solution 15 minutes, 21 grams of benzyl chloride was added dropwise from a separatory funnel at the rate of five to ten drops per minute. After the reaction was completed, the mixture was stirred for 15 minutes and warmed gradually to room temperature to evolve the ammonia. The residue in the flask was dissolved in 300 cc. of ice water and placed in a one-liter, three-necked flask provided with a mechanical-stirring device. The mixture was cooled to a temperature below 0° C. in an ice-salt bath and concentrated hydroiodic acid was added slowly while maintaining the temperature below 0° C. When the reaction mixture was neutralized and made slightly acidic by the addition of two drops of hydroiodic acid, the mixture was filtered, washed with a small amount of ethyl alcohol and finally with acetone. The crude product after drying was recrystallized from water solution. The product recovered was identified as S-benzylcysteine.

Example 13

A solution of 15 grams of S-benzylcysteine, prepared in accordance with the preceding example, in 300 cc. of anhydrous dioxane was charged to a 500-cc., four-necked flask fitted with a thermometer, stirring device, gas-inlet tube and reflux condenser. While maintaining the temperature at 18° C. to 20° C., sulfur dioxide was passed through the solution, until it became saturated and the sulfur dioxide was detected in the effluent gas stream. The solution was then warmed to 30° C. and phosgene added slowly until the suspension was converted into a clear solution, this taking place in approximately six hours. The excess phosgene was then removed by blowing with dry nitrogen for a three-hour period. The dioxane was then removed by subjecting the solution to a vacuum (pressure about 20–25 mm.) at 35° C. to 40° C. and the resulting solid material was suspended in hexane, filtered and dried. The product was then recrystallized twice from toluene solution and was identified as S-benzylcysteine N-carboxy anhydride having the following structural formula:

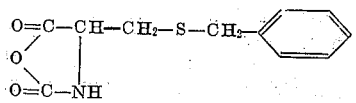

By analogous procedures to this example the following compounds can be prepared:

S-phenylcysteine N-carboxy anhydride:

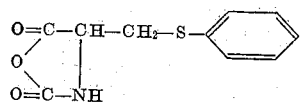

S-n-butylcysteine N-carboxy anhydride:

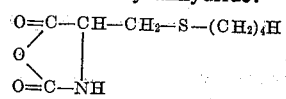

S-p-tolylcysteine N-carboxy anhydride:

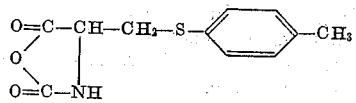

The instant application is a continuation-in-part of my copending applications, Serial No. 191,485, filed October 21, 1950, Serial Nos. 223,163, 223,164, and 223,165, filed April 26, 1951, and Serial No. 283,977, filed April 23, 1952, all of which are now abandoned.

I claim:

1. A method of preparing N-carboxy anhydrides of α-amino acids having the structural formula:

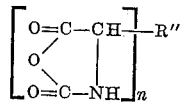

which comprises suspending an α-amino acid having the structural formula:

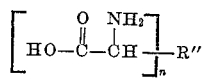

wherein $n$ is an integer from one to two and $R''$ is an organic radical, free from non-benzenoid unsaturation, having $n$ valency bonds and a molecular weight of less than 350, said $R''$ radical being inert to gaseous sulfur dioxide and phosgene under the instant processing conditions, in an inert anhydrous organic liquid; contacting the suspension with sulfur dioxide at a temperature between about 10° C. and about 25° C.; thereafter contacting the suspension with phosgene at a temperature between about 15° C. and about 60° C.; and recovering the resultant N-carboxy anhydrides of the α-amino acid from the reaction mixture.

2. A method of preparing N-carboxy anhydrides of α-amino acids having the structural formula:

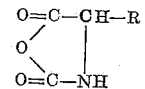

which comprises suspending an α-amino acid having the structural formula:

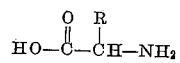

wherein R is a monovalent organic radical, free from non-benzenoid unsaturation, having a molecular weight of less than 350, which is inert to gaseous sulfur dioxide and phosgene under the instant processing conditions, in an inert anhydrous organic liquid; contacting the suspension with sulfur dioxide at a temperature between about 10° C. and about 25° C.; thereafter contacting the suspension with phosgene at a temperature between about 15° C. and about 60° C.; and recovering the resultant N-carboxy anhydride of the α-amino acid from the reaction mixture.

3. A method of preparing N-carboxy anhydrides of α-amino acids having the structural formula:

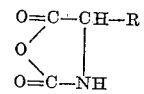

which comprises suspending an α-amino acid having the structural formula

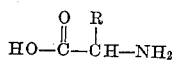

wherein R is a monovalent organic radical, free from non-benzenoid unsaturation, having a molecular weight of less than 350, which is inert to gaseous sulfur dioxide and phosgene under the instant processing conditions, in an inert anhydrous organic liquid; contacting the suspension with sulfur dioxide at a temperature between about 10° C. and about 25° C.; thereafter contacting the suspension with phosgene at a temperature between about 15° C. and about 60° C. to form a solution; and separating the N-carboxy anhydride of the α-amino acid from the said solution.

4. A method of preparing N-carboxy anhydrides of α-amino acids having the structural formula:

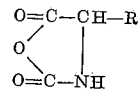

which comprises suspending an α-amino acid having the structural formula:

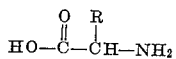

wherein R is a monovalent substituent selected from the group consisting of hydrogen; hydrocarbon radicals, free from non-benzenoid unsaturation, containing not more than 16 carbon atoms; thiahydrocarbon radicals, free from non-benzenoid unsaturation, containing not more than 16 carbon atoms; and hydrocarbon radicals, free from non-benzenoid unsaturation, containing not more than 16 carbon atoms and having at least one hydrogen atom thereon substituted by a member of the group consisting of iodo and bromo atoms, and amino, imimo, hydroxy and carboxy radicals, the functional radicals of which are rendered inert to gaseous sulfur dioxide and phosgene under the instant processing conditions by reaction with a blocking reagent, said modified radical having a molecular weight of less than 350; in an inert anhydrous organic liquid; contacting the suspension with sulfur dioxide at a temperature between about 10° C. and about 25° C.; thereafter contacting the suspension with phosgene at a temperature between about 15° C. and about 60° C.; and recovering the resultant N-carboxy anhydride of the α-amino acid from the reaction mixture.

5. A method of preparing N-carboxy anhydrides of α-amino acids which comprises suspending an α-amino acid having the structural formula:

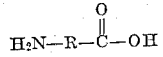

wherein R is the divalent aliphatic saturated hydrocarbon radical containing up to 16 carbon atoms in which both valence bonds are attached to the same carbon atom, in an inert anhydrous organic liquid, contacting the said suspension with sulfur dioxide at a temperature between about 10° C. and about 25° C., thereafter contacting the suspension with phosgene at a temperature between about 15° C. and about 60° C., and recovering the resultant N-carboxy anhydride of the α-amino acid.

6. A method of preparing the N-carboxy anhydride of an α-amino acid which comprises suspending leucine in an inert anhydrous organic liquid, contacting the suspension with sulfur dioxide at a temperature between about 10° C. and about 25° C., thereafter contacting the said suspension with phosgene at a temperature of from about 15° C. to about 60° C. to form a solution, and separating the N-carboxy anhydride of the α-amino acid from the said solution.

7. A method of preparing N-carboxy anhydrides of α-amino acids which comprises suspending an α-amino acid having the structural formula:

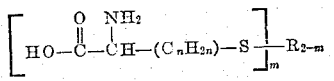

wherein $n$ is an integer from 1 to 4, $m$ is an integer from 1 to 2, and R is a saturated hydrocarbon radical containing up to 12 carbon atoms, in an inert anhydrous organic liquid; contacting the suspension with sulfur dioxide at a temperature between about 10° C. and about 25° C.; thereafter contacting the suspension with phosgene at a temperature between about 15° C. and about 60° C.; and separating the resultant N-carboxy anhydride of the α-amino acid from the reaction mixture.

8. The method of claim 7, wherein the α-amino acid is methionine.

9. A method of preparing N-carboxy anhydrides of α-amino acids which comprises suspending an α-amino acid having the structural formula:

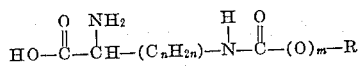

wherein $n$ is an integer from 1 to 10, $m$ is an integer from 0 to 1, and R is a hydrocarbon radical, free from non-benzenoid unsaturation, containing up to 12 carbon atoms, in an inert anhydrous organic liquid; contacting the suspension with sulfur dioxide at a temperature between about 10° C. and about 25° C.; thereafter contacting the suspension with phosgene at a temperature between about 15° C. and about 60° C.; and separating the resultant N-carboxy anhydride of the α-amino acid from the reaction mixture.

10. The method of claim 9, wherein the α-amino acid is ε-N-carbobenzoxy-L-lysine.

11. A method of preparing N-carboxy anhydrides of α-amino acids which comprises suspending an α-amino acid of the tyrosine group, wherein the hydroxyl groups are inactivated by the presence of a blocking group such that the phenolic portion of the compound has the structural formula:

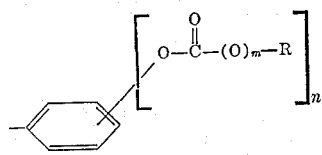

wherein $n$ is an integer from 1 to 2, $m$ is an integer from 0 to 1, and R is a hydrocarbon radical, free from non-benzenoid unsaturation, containing up to 12 carbon atoms, in an inert anhydrous organic liquid; contacting the suspension with sulfur dioxide at a temperature between about 10° C. and about 25° C.; thereafter contacting the suspension with phosgene at a temperature between about 15° C. and about 60° C.; and separating the resultant N-carboxy anhydride of the α-amino acid from the reaction mixture.

12. The method of claim 11, wherein the α-amino acid is O-carbobenzoxy tyrosine.

13. A method of preparing N-carboxy anhydrides of α-amino acids which comprises suspending dicarboxylic α-amino acid containing up to 12 carbon atoms, said α-amino acid being free from sulfur and non-benzenoid unsaturation, and the non-alpha carboxyl group of which is inactivated by the presence of a saturated hydrocarbon radical containing up to 12 carbon atoms thereby forming the monoester of said α-amino acid, in an inert anhydrous organic liquid; contacting the suspension with sulfur dioxide at a temperature between about 10° C. and about 25° C.; thereafter contacting the suspension with phosgene at a temperature between about 15° C. and about 60° C.; and separating the resultant N-carboxy anhydride of the α-amino acid from the reaction mixture.

14. The method of claim 13, wherein the α-amino acid is γ-monoethyl glutamate.

References Cited in the file of this patent

UNITED STATES PATENTS 2,647,907    Richardson _____ Aug. 4, 1953

OTHER REFERENCES

Farthing et al.: Nature, vol 165, page 647 (1950).